Oct. 11, 1932.  E. H. REMDE  1,882,036
INDUSTRIAL TRUCK
Filed Aug. 25, 1930  5 Sheets-Sheet 2

Oct. 11, 1932.  E. H. REMDE  1,882,036
INDUSTRIAL TRUCK
Filed Aug. 25, 1930    5 Sheets-Sheet 3

Oct. 11, 1932.    E. H. REMDE    1,882,036
INDUSTRIAL TRUCK
Filed Aug. 25, 1930    5 Sheets-Sheet 4

INVENTOR
Edward H. Remde
BY
Geo. B. Pitts
ATTORNEY

Oct. 11, 1932.                E. H. REMDE                1,882,036
                             INDUSTRIAL TRUCK
                    Filed Aug. 25, 1930        5 Sheets-Sheet 5

INVENTOR
Edward H. Remde
BY
Geo. R. Pitts
ATTORNEY

Patented Oct. 11, 1932

1,882,036

UNITED STATES PATENT OFFICE

EDWARD H. REMDE, OF CLEVELAND, OHIO, ASSIGNOR TO THE BAKER-RAULANG COMPANY, OF CLEVELAND, OHIO, A CORPORATION OF OHIO

INDUSTRIAL TRUCK

Application filed August 25, 1930. Serial No. 477,571.

This invention relates to an industrial truck.

One object of the invention is to provide in a load handling mechanism having one or more flexible operating members or cables, an improved means for taking up slack therein, whereby positive and quick cut-off of the power takes place.

Another object of the invention is to provide a relatively simple construction of slack take-up means for the flexible operating device or cable for a power operated hoist member.

Other objects of the invention will be apparent to those skilled in the art to which my invention relates from the following description taken in connection with the accompanying drawings, wherein.

Figures 1, 8:
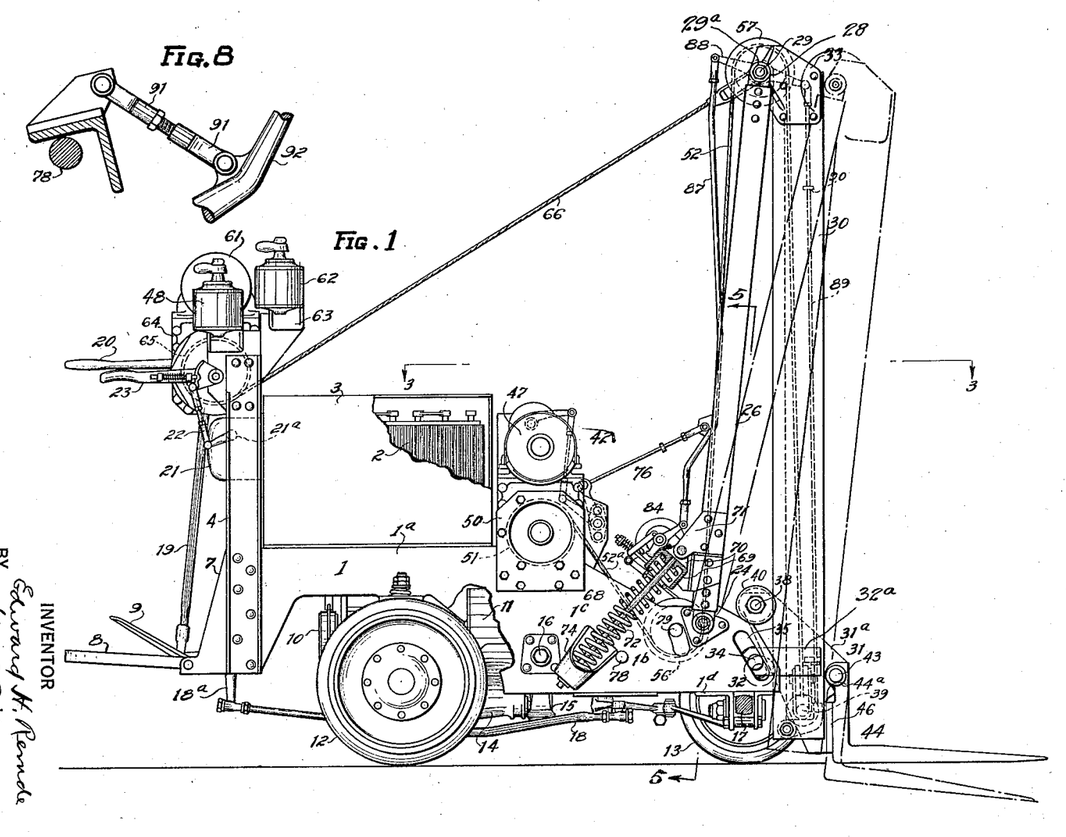
Fig. 1 is a side elevation of a truck, partly in section substantially on the line 1—1 of Fig. 3 and parts broken away to facilitate the illustration, embodying my invention.
Fig. 8 is a detail view.

In the drawings, 1 indicates a frame preferably comprising a main section 1a and a relatively low section 1b connected in rigid relation to the main section 1a by side plates 1c. 2 indicates the electric batteries supported on the main section 1a, these being preferably enclosed in a sheet metal casing 3 having one or more removable sections or walls. 4 indicates a pair of uprights (only one being shown in Fig. 1) secured to the frame 1 at its driving end. At their extended lower ends, the side plates 1c pivotally support an operative's platform 8. 9 indicates a foot pedal associated with the platform 8 and arranged to release a brake mechanism 10 which engages and disengages a wheel or other element driven by a motor 11, the latter being supplied with current from the batteries 2. 12, 13, indicate pairs of wheels for supporting the frame 1, the former being below the main frame section 1a and driven in a well known manner by the motor 11 through suitable power transmitting mechanism. The power transmitting mechanism is enclosed in a suitable housing and the latter terminates in a cradle 14 to which the motor 11 is rigidly connected, as shown in Fig. 1. The cradle 14 is supported by a torque member 15 trunnioned at 16 in the side plates 1c and connected by a universal joint to the cradle 14, the construction and arrangement of the torque member and its connections being substantially similar to like parts shown in Letters Patent No. 1,628,145, dated May 10, 1927. The wheels 12 are mounted in a well known manner for steering purposes; likewise the wheels 13 are mounted on knuckles 17' at the opposite ends of an axle 17, which is pivoted at 1d between angles 1e carried by the frame section 1b. Both pairs of wheels are connected by connections 18, for simultaneous steering, and these connections lead to a bell-crank 18a, suitably mounted on the frame 1 and operated through a link 19 by a lever 20. 21 indicates a controller for controlling the supply of current to the motor 11. The controller drum is geared to a shaft 21a which is connected by a linkage 22 to an operating handle 23.

24 indicates a pair of stud shafts extending laterally from the opposite outer sides of the side plate 1c.

Figures 3, 5:
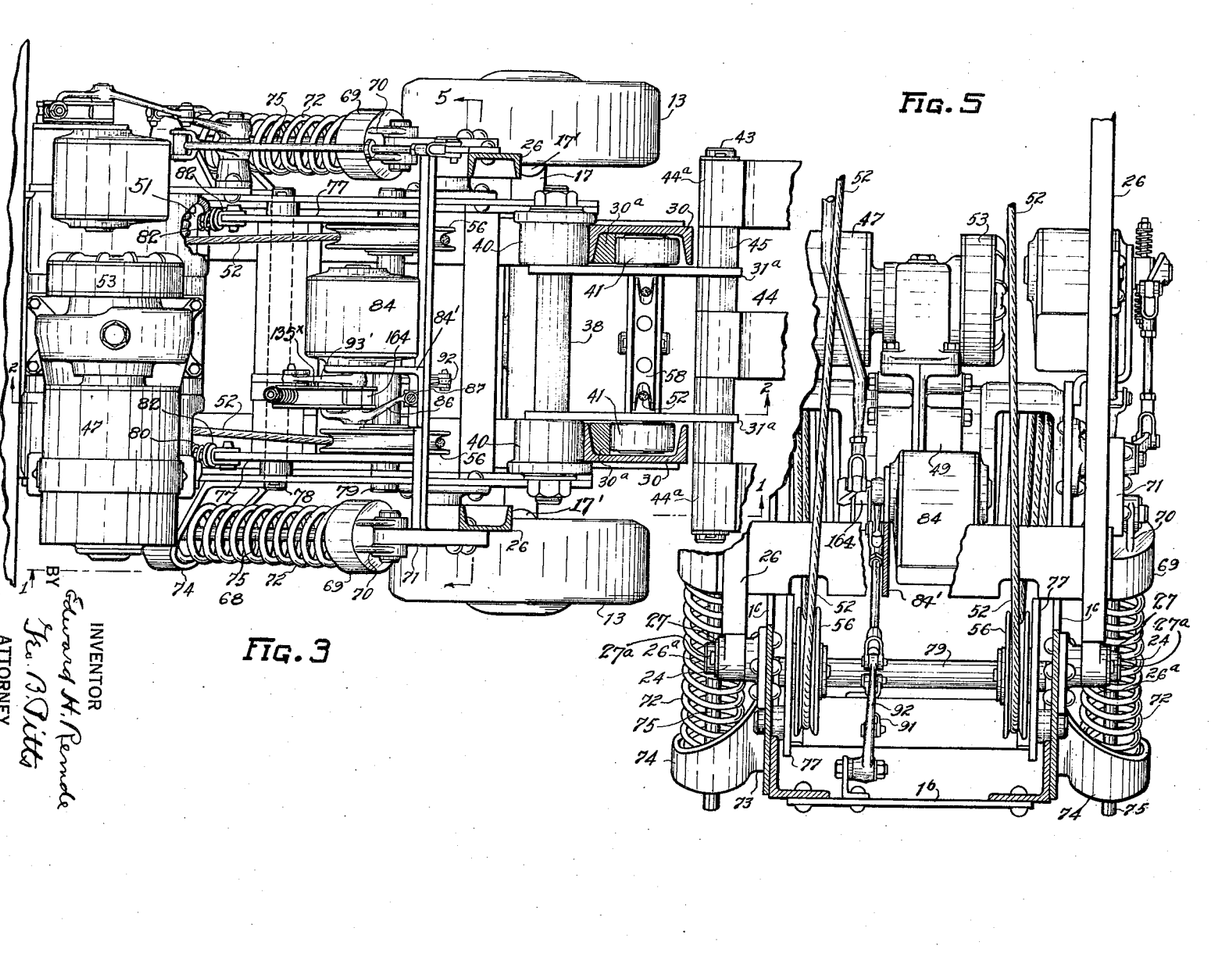
Fig. 3 is a fragmentary section on the line 3—3 of Fig. 1.
Fig. 5 is a fragmentary section on the line 5—5 of Figs. 1 and 3.

26 indicates a pair of members swingably mounted at their lower ends on the stud shafts 24. For this purpose the lower end of each member 26 is provided with a casting terminating in a knuckle 26a through which the adjacent shaft 24 extends so that the member 26 may swing about the latter, the knuckle being secured to the shaft by a washer 27 and a cotter pin 27a as shown in Fig. 5. The upper ends of the members 26 are also provided with castings terminating in knuckles 28, which rotatably receive the ends of a shaft 29, the latter being held against endwise movement by nuts 29a. 30 indicates a guide frame comprising a pair of spaced guides for an elevating member 31 pivotally connected at their upper ends to the shaft 29 and depending therefrom. The shaft 29 serves to support the guides 30 and elevating member 31 when the guides are in vertical position or tilted (see Fig. 1) and to swing the upper ends of the guides inwardly when the members 26 are tilted or swing about the shafts 24, for example, to the position shown in Fig. 6. The lower ends of the guides 30 have sliding or rolling and pivotal engagement or connection with the low frame section 1b, such connection being indicated as an entirety at 32, so that when the guides are tilted inwardly, a portion of the weight of the guides and elevating member is carried by the low frame section 1b instead of entirely by the members 26. The connection 32 includes an interlock between the guide frame 30 and side plates 1c to prevent outward movement of the guide 30 should the upper ends of the members 26 swing forwardly unduly. The connection 32 is above the front end of the frame section 1b and the guides 30 extend below the latter, so that the frame 1b serves as a stop to limit the undue forward movement of the guides 30 and members 26 at their upper ends in the event of breakage of some part or failure of the limit switch (to be later referred to) to operate.

The connection between the guides 30 and shaft 29 may comprise brackets 33 fixed to the guides and extending inwardly substantially at right angles thereto and formed with openings through which the shaft 29 extends.

Of the connection 32, 32a indicates a bracket secured to the outer side of each guide channel and extending inwardly therefrom into overlapping relation with the forward portions of the side plates 1c. The brackets are formed with aligned openings which support a shaft 34. The opposite ends of the shaft extend through openings 35 formed in the plates 1c for a purpose later to appear. Between the plates 1c, the shaft carries rollers 36. The rollers 36 roll on tracks or guides 37 on the frame 1c and thus permit the lower portion of the guide frame to slide and pivot on and relative to the forward end portion of the frame section 1b. The openings 35 are elongated to accommodate the movement of the shaft as the above operation takes place. As the shaft 34 extends through the openings 35, the engagement of the shaft with the outer walls of these openings provides an interlock between the lower portion of the guide frame and frame section 1b so that danger of the lower ends of the guides swinging away from its abutment or relative to the low frame is eliminated. It will also be noted that the brackets 32a overlap the outer ends of the side plates 1c and are arranged in close side by side relation thereto, the purpose being to prevent lateral swinging of the guides. My construction permits the guides to be supported and tilted in a relatively simple manner; at the same time it insures rigidity and steadiness of the guides when in either normal or tilted position. As a result the truck may be driven over uneven surfaces without danger of tipping the load. The connection 32 permits the guide frame to be tilted forwardly, as shown in dotted lines (Fig. 1), to facilitate loading and unloading operations.

The elevation member comprises a pair of spaced plates 31a disposed between the guides 30 and connected in a suitable manner by an upper cross rod 38 and two lower cross rods 39, 39a. The opposite ends of the rod 38 form shafts for rollers 40 which roll on the inner side edge of the guide channels 30. The opposite ends of the rod 39 form shafts for rollers 41 preferably disposed between the flanges of the guide channels 30 and engaging guide rails 30a fixed to their inner flanges. The pairs of rollers 40, 41, co-operate to movably mount the elevating member 31 on the guide frame, whereby the member may be raised and lowered thereon by a hoist mechanism indicated as an entirety at 42.

The plates 31a support a transverse removable rod 43, to which is connected a load carrier 44. The carrier preferably comprises a plurality of L-shaped devices, the horizontal portions of which are arranged to be projected below a load, whereby the latter may be tilted or raised or both tilted and raised. The vertical portions of the L-devices are provided at their upper ends with knuckles 44a through which the rod 43 loosely extends to support the devices and permit them to be swung upwardly into an inoperative position. As shown in Fig. 3, the carrier L-devices 44 are spaced on the rod 43 by sleeves 45 and the outer ones held on the rod by cotter pins 46. Below the rod 43, the vertical portions of the L-devices engage a transverse plate or bar 46 suitably secured to the lower outer edges of the plates 31a, to limit the downward swing of the carrier devices to thus support their horizontal portion in operative position.

The hoist mechanism 42 comprises an electric motor 47 which is supplied with current from the batteries 2; the current being controlled by a controller 48. The motor 47 is supported on a housing 49. The housing is supported at its opposite sides by plates 50 secured thereto and to the side plates 1c, as shown in Figs. 1, and 3. Within the housing 49 are mounted suitable drums 51 on which cables 52, 52, wind or unwind simultaneously according to the direction of rotation of the shaft of the motor 47. The shaft of the motor is automatically held against rotation or freed by a magnetically operated brake, enclosed in the casing 53, the windings of the electromagnet being connected in series with the motor and arranged to release the motor shaft when the circuit to the motor is closed. The drums 51 are connected to a shaft mounted within the casing 49 and this shaft is driven through suitable reduction gearing by the shaft of the motor 47. If desired, suitable reduction gearing may be interposed between the driven shaft and each drum 51.

The construction of the driving mechanism for the drums, the motor, the motor mounting and the magnetic brake for its shaft are substantially similar in construction to like parts shown in my application Ser. No. 133,699, filed September 4, 1926, except that the driven shaft carries drums instead of sprockets for chains. From the drums 51, the cables 52, 52, extend to and reeve around sheaves 56, 56, which are movably mounted adjacent the lower ends of the members 26, as will later appear, and from these sheaves the cables 52, 52, extend to and around sheaves 57, 57, loosely mounted on the shaft 29, and from the latter sheaves the cables extend downwardly and are suitably connected to the equalizer 58 mounted in any desired manner. The equalizer 58 is pivoted between the legs of a U shaped member 59 which loosely fits around the rod 39a.

60 indicates as an entirety the means for tilting or swinging the members 26 inwardly from their normal or upright position and for controlling their movement from the inwardly tilted position back to their normal or outwardly tilted position. Of these means, 61 indicates a motor which is supplied with current from the batteries 2; the current being controlled by a controller 62, carried by a bracket 63. The motor 61 is supported on a housing 64. The housing is rigidly secured at its opposite ends to the upper ends of the uprights 4. Within the housing 64 are mounted suitable drums 65 on which cables 66 wind or unwind simultaneously according to the direction of rotation of the shaft of the motor 61. The shaft of the motor is automatically held against rotation or freed by a magnetically operated brake, enclosed in a casing (not shown), the windings of the electro-magnet being connected in series with the motor and arranged to release the motor shaft when the circuit to the motor is closed. The drums 65 are connected to a shaft mounted within the casing 64 and this shaft is driven through suitable reduction gearing by the shaft of the motor 61. If desired, reduction gearing may be interposed between the driven shaft and each drum 65. The construction of the drums 65, the driving mechanism therefor, the motor, the motor mounting and the brake for the motor shaft may be similar to like parts for operating the cables 52.

The cables 66 preferably comprise two sections or lengths, the inner ends thereof being connected to the drums 65 to wind on or off thereof simultaneously. The outer ends of the cables 66 are suitably connected to a pair of devices 67 which have knuckles loosely fitting the shaft 29.

Figure 6:
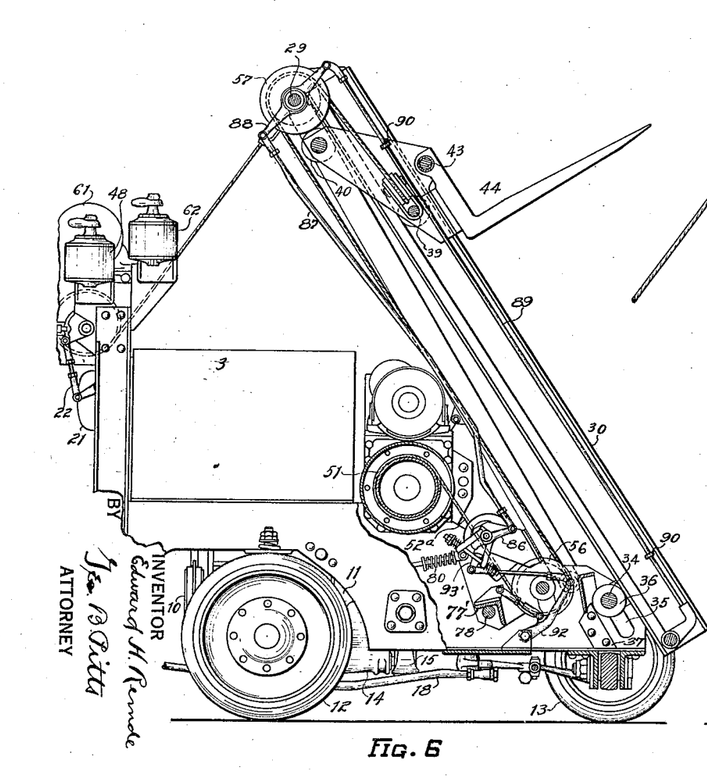
Fig. 6 is a sectional view of the truck showing the load carrier elevated and tilted inwardly.

In my improved construction, the pivots or shafts 24 for the swingable members 26 are preferably arranged as near the outer end of the low frame section as possible, so that the swingable members may be tilted to an extreme position of inclination, as shown in Fig. 6. When in this position, the load carrying member 31 forms a cradle for the load and thus elminates danger of the load or portions thereof being jounced off. For this reason, the truck may be advantageously used for handling and transporting packs of sheet steel or other sheet material, whether such packs are crated or bound together or in stacked relation without binding means around them.

By inclining the members 26 to the position shown, all portions of the elevating member 31, when moved upwardly, as shown in Fig. 6, will be positioned inwardly of the outer extremities of the wheels 13; so that the truck may be stored, turned or manipulated in a restricted area. However, it will be noted that when the members 26 are tilted to the position shown and the elevating member 31 is moved upwardly the center of gravity of these parts, that is, the members 26, guides 30 and elevating member 31, moves or shifts to a point inwardly of the shaft 24. For this reason I provide means, indicated as an entirety at 68, for (a) yieldingly arresting the inward movement of the members 26, upon the stopping of the motor 61 and (b) for swinging or returning the members outwardly, upon the paying out of the cables 66, far enough to shift the center of gravity outwardly of the shaft 24. The arresting and return means 68 comprise a set of devices between each swingable member 26 and the frame 1. As these sets of devices are similar I will describe one set as follows: 69 indicates a socket or cup member having ears 70 pivotally connected to a lug 71 carried by the adjacent member 26. The socket 69 forms a seat for one end of a coiled spring 72, the opposite end of the spring engaging a bracket 73 mounted on the adjacent side plate 1c or seated within a cup member 74 carried thereby. 75 indicates a rod extending through the coils of the spring 72 to guide the coils as they are compressed or expanded and to prevent undue buckling thereof. The upper end of the rod 75 is secured in any desired manner to the bottom of the socket 69 and centrally thereof; the opposite end of the rod extends through an opening formed centrally of the cup member 74, this opening being large enough to permit the rod to rock or swivel as well as slide therein due to the arc traversed by the socket 69 as the member 26 swings inwardly and outwardly.

Figures 7, 9:
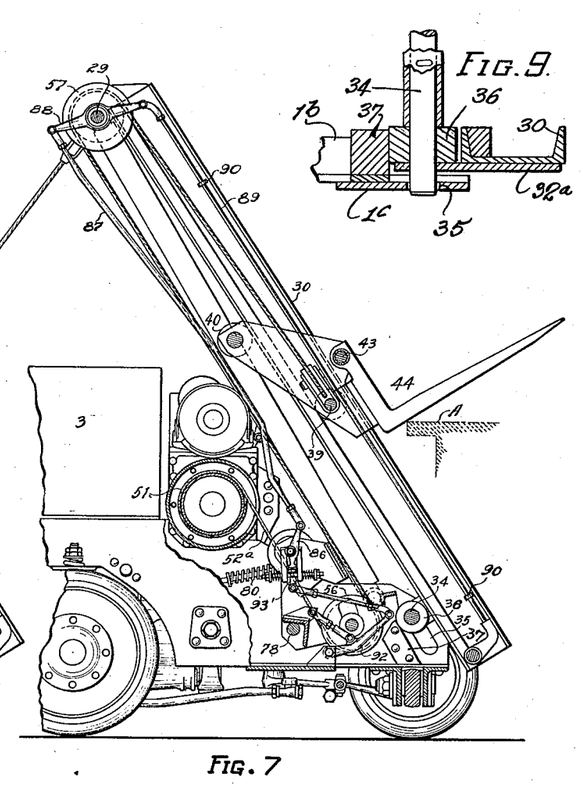
Fig. 7 is a view similar to Fig. 6, but showing the operation of the slack take-up means when the carrier engages an obstruction in its downward movement.
Fig. 9 is a fragmentary section on the line 9—9 of Fig. 2.

When the cables 66 are wound on the drums 65, and the guide frame is tilted to the position shown in Figs. 6 and 7, the springs 72 are compressed, so that upon the paying out of the cables the springs will swing the guide frame forwardly.

76 indicates as an entirety a limiting means for stopping the motor 61 when the members 26 reach their limit of swinging movement in either direction. As these means form no part of the present invention, further description thereof will not be made.

The limit means for stopping the motor 61 are arranged to break the circuit when the members 26 approach their limit of movement and the arresting springs are of such strength that they arrest and support the members 26 at their inner position whether the elevating member is loaded, and with or without a load, it is raised to its highest position. To tilt the members 26, the cables 66 are wound on the drums 65, thereby pulling the upper ends of the members 26 inwardly in opposition to the springs 72 until the motor is stopped. When the motor is stopped the drums will be held against rotation; hence the cables 66 will hold the members in their inclined position and prevent the springs 72 from moving the members outwardly; but upon paying out of the cables 66 the springs 72 will move the members 26 outwardly and keep the cables 66 taut between the members 26 and the drums during such movement. It will thus be seen that while the cables 66 move the members 26 inwardly and the springs move them outwardly, the movement of the members in both directions is under the control of the drums or the motor 61 for driving them.

77 indicates a pair of plates fulcrumed on a shaft 78, which is supported at its opposite ends in the side plates 1c (see Fig. 1). The plates may be rigidly connected by an angle 77′. Each plate is preferably substantially of triangular shape and is arranged so that one apex or extremity 77a which is pivoted on the shaft 78, depends downwardly. In this arrangement the guide sheaves 56 are mounted on a shaft 79 which is mounted in openings formed in the upper outer extremities 77b of the plates, and the drums 51 for the cables 52 are mounted inwardly and above the plates 77, so that the sheave axes and the fulcrum for the plates are normally disposed in a plane at substantially right angles to the pull of the cable runs 52a, and the sheaves 56 move in a path disposed between the cable runs 52a, 52b. By preference, the shaft 78 is disposed below the cable run 52a to provide a long leverage. Furthermore, the arrangement is such that the axis of the pivots for the swingable members 26 coincides substantially with the points of engagement of the cable runs 52b with the sheaves 56, so that the sheaves will have substantially the same relation to the cable runs 52b in any tilted position of the guide frame 30, and thus operate positively and effectively to take up cable slack and to stop the motor 47 immediately following the engagement of the elevating member 31 or carrier 44 with an obstruction A (Fig. 7). The plates 77 are yieldingly maintained in normal position and against the pull of the cables 52 by a pair of springs 80, each interposed between one side plate 1c and the upper inner extremity 77c of the adjacent sheave carrying plate 77. Each spring 80 surrounds a rod 81 having a collar 82 forming a seat for one end of the spring and having a knuckle suitably pivoted on the extremity 77c. The other end of the spring engages a bracket 83 suitably fixed on the inner side of the adjacent side plate 1c, the bracket 83 being formed with an opening through which the rod 81 slidably extends and pivots. In the event slack occurs in the cables 52, the springs 80 operate to swing the plates 77 outwardly about the shaft 78 and thus move the sheaves in a downward direction, whereby such slack is taken up.

84 indicates as an entirety a limit switch mechanism which is operatively connected to the elevating member and slack take-up means to effect stoppage of the motor 47 when the elevating member reaches its limit of movement in either direction or the slack take-up means operate as above set forth. The switch mechanism 84 is mounted on a bracket 84′, which is supported by the members 26. The switch mechanism is preferably similar in construction to that described in my co-pending application filed March 18, 1930, Ser. No. 436,855, the operating member of which is fixed to a shaft 85. 86 indicates a lever fixed to the shaft 85, one arm of the lever being pivotally connected to the lower end of a link 87. The upper end of the link is connected to one end of a rocker 88 fulcrumed on the shaft 29. From the other end of the rocker depends a rod 89 disposed substantially parallel to the guide frame 30 and carrying adjustable tappets 90 one thereof being arranged to be engaged by the elevating member 31, when the latter is moved to its extreme position in either direction. When either tappet is engaged the rod 89 through the rocker 88, link 87 and lever 86 operates the switch to open the motor circuit and thus stop the motor 47.

Figures 2, 4:
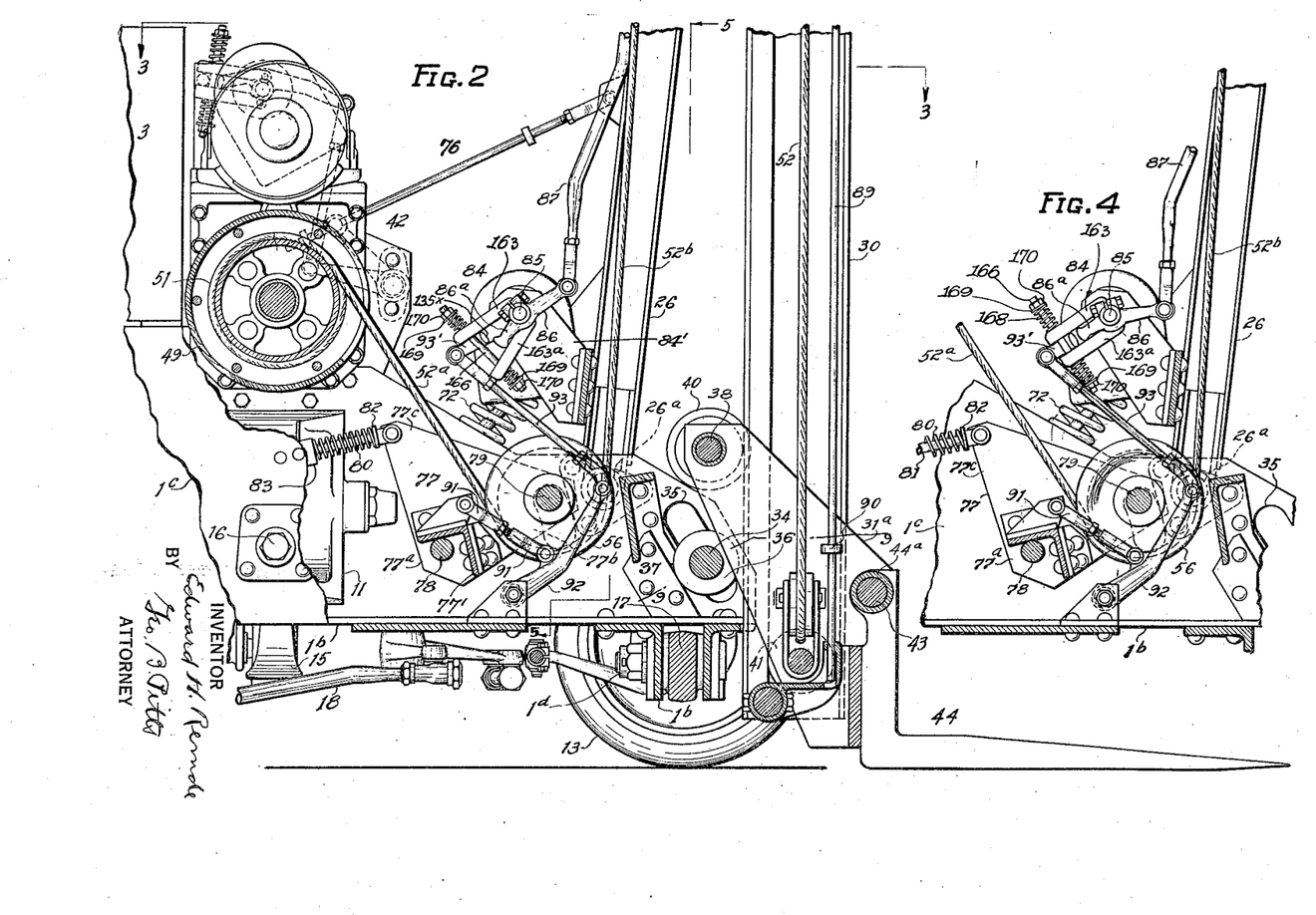
Fig. 2 is a fragmentary section on the line 2—2 of Fig. 3, enlarged.
Fig. 4 is a fragmentary view of parts shown in Fig. 2.

The operating connections between the slack take-up means and the shaft 85 of the switch mechanism 84 comprise the following (see particularly Fig. 4): 91 indicates a link (comprising adjustable sections) pivoted at one end on one of the plates 77 and pivotally connected at its other end to a lever 92, which is pivotally mounted at one end on the frame section 1b. The opposite end of the lever 92 is pivotally connected to a link 93, which in turn is pivoted to an arm 93′ mounted loosely on the shaft 85. By preference, the axis of the pivot connection between the lever 92 and link 93 coincides with the axes of the shafts 24 so that the relation of the slack take-up means and the switch mechanism 84 is not affected by the tilting of the members 26. The arm 93′ is provided with a lateral finger 135x (see Figs. 2 and 3) disposed between a pair of arms 163, 163a, pivotally mounted at their inner ends upon diametrically opposite sides of a collar 164 loosely mounted on the shaft 85 betwen the hub of the arm 93′ and the lever 86. When the operating member of the switch mechanism is in normal position (as shown in Fig. 4), the arms 163, 163a, will be disposed substantially parallel to each other upon opposite sides of the finger 135x and the other arm 86a of the lever 86. The outer portions of the arms 163, 163a, are formed with openings (elongated longitudinally of the arms) in which is mounted a rod 166 extending to either side of the arms. 168 indicates a spring coiled around the rod 166 between each arm 163, 163a, and a collar 169 adjustably fixed to the adjacent outer portion of the rod by a nut 170 and normally tending to maintain the adjacent arm in the position shown in Fig. 4. From the foregoing description it will be seen that through the co-action of the springs acting simultaneously to hold the arms 163, 163a, in engagement with the lever arm 86a and finger 135x, these arms will serve as a connection between the arm 93′ and the lever 86, so that in the event the sheave carrying plates 77 swing about the shaft 78, due to slack occurring in the cables 52, the arm 93′ will operate through these parts and the lever arm 86a to operate the switch operating member, the effect of which is to stop the motor 47. When the elevating member 31 is moved to its extreme lower position (see Fig. 2), the lever 86 is rocked to operate the switch mechanism as already described, but as the arms 163, 163a, are swingable independently away from each other, it will be seen that the arm 86a of the lever 86 will swing the arm 163a laterally, compressing the adjacent spring 168, whereas the finger 135x will hold the other arm 163 stationary (see Fig. 2); likewise, when the elevating member 31 is moved to its extreme upper position, the lever arm 86a will swing the arm 163 laterally and the finger 135x will hold the other arm 163a stationary.

It will therefore be seen that through this compensating connection between the lever 86 and the arm 93′, the cut-out mechanism 84 is operable independently of and without affecting the take-up mechanism. It will also be noted that the cut-out mechanism is operated by the elevating member 31 and the slack take-up mechanism in any position to which the guides may be moved.

Figures 10, 11:
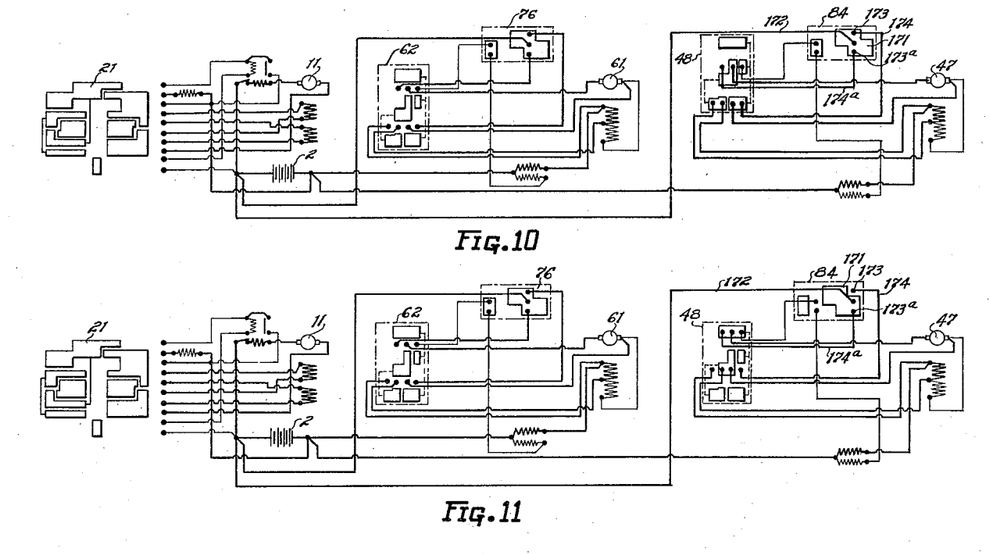
Fig. 10 is a diagram showing the controller for the hoisting motor in operated position.
Fig. 11 is a diagram similar to Fig. 10, but showing the limit switch in the circuit for the hoisting motor, in operated position.

Fig. 10 is a diagram of the electric circuits for the traction motor 11, hoisting motor, 47 and tilting motor 61 from the batteries 2, with the controller 48 operated to the position to lower the elevating member 31. With the controller 48 in neutral position or operated to raise or lower the elevating member 31, the contact element 171 of the switch 84 (to which element a lead 172 from the batteries 2 is connected) engages terminals 173, 173a, for the leads 174, 174a, respectively. If, in the downward movement of the elevating member 31, it is operated to the limit of its movement or it engages an obstruction and causes slack to occur in the cables, the switch 84 operates, that is, the contact element 171 disengages the terminal 173 as shown in Fig. 11, and thus breaks the circuit to the motor 47; but as the contact element 171 remains in engagement with the terminal 173a (see Fig. 11), the motor 47 may be reversed to raise the elevating member 31. Following the movement upwardly of the elevating member 31, the contact element 171 returns to its normal position as shown in Fig. 10; and if the elevating member 31 is raised to its limit of upward movement, the contact element 171 disengages the terminal 173a; but as the contact element 171 remains in engagement with the terminal 173, the motor 47 may be reversed to lower the elevating member 31.

The limit switch 76 for the motor 61 operates in the same manner as above described.

To those skilled in the art to which my invention relates, many modifications and embodiments of the invention and applications thereof will suggest themselves without departing from the spirit and scope thereof. The description and disclosure herein are purely illustrative and are not intended to be in any sense limiting.

What I claim is:

1. In an industrial truck, the combination of a wheel mounted frame, an upwardly extending guide frame thereon, an elevating member movably mounted on said guide frame, a hoist mechanism comprising a power driven drum mounted on said wheel mounted frame above the lower portion of said guide frame and a flexible member arranged to wind on and off said drum at its inner end and connected at its outer end to said elevating member, a sheave at the upper end of said guide frame around which said member runs, a separate sheave around which said member runs, a device supporting said separate sheave at its upper end and pivoted on said wheel mounted frame below the run of said flexible member from said drum to said separate sheave, and means normally acting on said device to move said separate sheave in a direction opposite to the pull thereon by said flexible member.

2. In apparatus of the class described, the combination of a wheel mounted frame, a member pivotally mounted at its lower end on said frame and swingable inwardly and outwardly, a guide pivotally connected to the upper end of said swingable member and having movable engagement at its lower portion with said frame, means for swinging said swingable member, an elevating member mounted for movement along said guide, a flexible member connected to said elevating member for moving it along said guide, a sheave at the upper end of said guide and around which said flexible member is reeved, a support mounted on said wheel mounted frame to move relative thereto, a sheave carried by said support and around which said flexible member is reeved, means for winding up and paying out said flexible member, the pull on said flexible member operating through the sheave on said support to move the latter in one direction, and a spring normally acting on said support to move it in the opposite direction.

3. In apparatus of the class described, the combination of a wheel mounted frame, a member pivotally mounted at its lower end on said frame and swingable inwardly and outwardly, a guide pivotally connected to the upper end of said swingable member and having movable engagement at its lower portion with said frame, means for swinging said swingable member, an elevating member mounted for movement along said guide, a flexible member connected to said elevating member for moving it along said guide, a sheave at the upper end of said guide and around which said flexible member is reeved, a support mounted on said wheel mounted frame to move relative thereto, a sheave carried by said support and around which said flexible member is reeved, means for winding up and paying out said flexible member, the pull on said flexible member operating through the sheave on said support to move the latter in one direction, and a spring normally acting on said support to move it in the opposite direction, the axis of the pivot for said swingable member being substantially coincident with the contact of said flexible member with one side of the last mentioned sheave.

4. In apparatus of the class described, the combination of a wheel mounted frame, a member pivotally mounted at its lower end on said frame and swingable inwardly and outwardly, a guide pivotally connected to the upper end of said swingable member and having movable engagement at its lower portion with said frame, means for swinging said swingable member, an elevating member mounted for movement along said guide, a flexible member connected to said elevating member for moving it along said guide, a sheave at the upper end of said guide and around which said flexible member is reeved, a support mounted on said wheel mounted frame to move relative thereto, a sheave carried by said support and around which said flexible member is reeved, means for winding up and paying out said flexible member, the pull on said flexible member operating through the sheave on said support to move the latter in one direction, a spring normally acting on said support to move it in the opposite direction, a limit switch mechanism carried by said swingable member, and a linkage between said support and said switch mechanism arranged to operate the latter when said support is operated by said spring, whereby said winding up and paying out means is stopped.

5. In apparatus of the class described, the combination of a wheel mounted frame, a member pivotally mounted at its lower end on said frame and swingable inwardly and outwardly, a guide pivotally connected to the upper end of said swingable member and having movable engagement at its lower portion with said frame, means for swinging said swingable member, an elevating member mounted for movement along said guide, a flexible member connected to said elevating member for moving it along said guide, a sheave at the upper end of said guide and around which said flexible member is reeved, a support mounted on said wheel mounted frame to move relative thereto, a sheave carried by said support and around which said flexible member is reeved, means for winding up and paying out said flexible member, the pull on said flexible member operating through the sheave on said support to move the latter in one direction, a spring normally acting on said support to move it in the opposite direction, a limit switch mechanism carried by said swingable member, and a linkage between said support and said switch mechanism arranged to operate the latter when said support is operated by said spring, whereby said winding up and paying out means is stopped, the axis of the pivot between the links connected to said mechanism and to said support being substantially coincident to the axis about which said swingable member swings.

6. In an industrial truck, the combination of a wheel mounted frame, an upwardly extending guide frame at the forward end thereof, a plate pivotally supported on said wheel mounted frame rearwardly of said guide frame to swing in a longitudinal plane, a sheave mounted on said plate, a sheave supported at the upper end of said guide frame, an elevating member movably engaging said guide frame, a hoisting means comprising a power driven drum on said wheel mounted frame and a flexible member arranged to wind on and off said drum at one end, engaging said sheave and connected at its outer end to said elevating member, and spring operated means normally acting on said plate to swing it in a direction opposite to the pull of said flexible member thereon.

7. In an industrial truck, the combination of a wheel mounted frame, an upwardly extending guide frame at the forward end thereof, a pair of plates pivotally supported on said wheel mounted frame rearwardly of said guide frame to swing in a longitudinal plane, a pair of sheaves mounted on said plates, a pair of sheaves supported at the upper end of said guide frame, an elevating member movably engaging said guide frame, a hoisting means comprising power driven drums on said wheel mounted frame and flexible members arranged to wind on and off said drums at one end, engaging said sheaves and connected at their outer end to said elevating member, spring operated means normally acting on said plates to swing them in a direction opposite to the pull of said flexible members thereon, and a limit switch mechanism controlled by the movement of one of said plates to abnormal position for shutting off the power to said drums.

8. In an industrial truck, the combination of a wheel mounted frame, a member pivotally mounted on the forward portion of said frame, a guide member pivotally connected at its upper end to the upper end of said pivoted member and movably engaging the front end of said wheel mounted frame, an elevating device movably supported on said guide member, power operated means connected to one of said members for swinging their upper ends inwardly, a device swingably mounted on said frame inwardly of said members, a sheave carried by said swingable device, a sheave supported at the upper end of said members, a hoist means comprising a power driven drum supported on said frame and a cable arranged to wind on and off said drum at one end, engaging said sheaves and connected at its outer end to said elevating member, spring operated means normally acting on said swingable device in a direction opposite to the pull of said cable thereon, a limit switch mechanism carried by one of said members, and connections between said mechanism and said swingable device for operating said mechanism to stop the power for said drum when said swingable device is actuated by said spring operated means.

9. In an industrial truck, the combination of a wheel mounted frame, a member pivotally mounted on the forward portion of said frame, a guide member pivotally connected at its upper end to the supper end of said pivoted member and movably engaging the front end of said wheel mounted frame, an elevating device movably supported on said guide member, power operated means connected to one of said members for swinging their upper ends inwardly, a device swingably mounted on said frame inwardly of said members, a sheave carried by said swingable device, a sheave supported at the upper end of said members, a hoist means comprising a power driven drum supported on said frame and a cable arranged to wind on and off said drum at one end, engaging said sheaves and connected at its outer end to said elevating member, spring operated means normally acting on said swingable device in a direction opposite to the pull of said cable thereon, a limit switch mechanism carried by one of said members, connections between said mechanism and said swingable device for operating said mechanism to stop the power for said drum when said swingable device is actuated by said spring operated means, and connections between said mechanism and said elevating member arranged to operate said mechanism when said elevating member reaches its limit of movement in one direction.

In testimony whereof, I have hereunto affixed my signature.

EDWARD H. REMDE.